Patented Nov. 3, 1936

2,059,850

UNITED STATES PATENT OFFICE 2,059,850

SYNTHETIC RESINS

Cole Coolidge, Wilmington, Del., assignor to E. I. du Pont de Nemours & Company, Wilmington, Del., a corporation of Delaware No Drawing. Application April 16, 1932, Serial No. 605,799

7 Claims. (Cl. 260—8)

This invention relates to synthetic resins and more particularly to resins of the polyhydric alcohol-polybasic acid type.

This invention has as an object the production of improved polyhydric alcohol-polybasic acid resins. Other objects will appear hereinafter.

These objects are accomplished by the following invention which consists in introducing one or more ketone groups into the resin by including in the reaction mixture of resin ingredients certain compounds containing a ketone group.

As well understood by those skilled in the art, polyhydric alcohol-polybasic acid resins are made by reacting with heat treatment a polyhydric alcohol and a polybasic acid with or without various modifying agents such as fatty oils, fatty oil acids, and natural acidic gums. I have discovered that the introduction of ketone groups into these resins in the manner hereinafter disclosed results in products which are especially valuable as ingredients of protective coatings. For introducing ketone groups into the resins in accordance with the present invention I preferably use a ketone alcohol having not more than two alcoholic hydroxyl groups in total or partial replacement of the polyhydric alcohol usually used. The ketone alcohol so used may be either monohydric or polyhydric; if monohydric, however, only a partial replacement of the glycerol, for example, is made inasmuch as the reaction mixture should comprise at least one polyhydric alcohol.

The following example is illustrative of the preparation of a resin from a polybasic acid and a ketone polyhydric alcohol. Such a combination, in which no glycerol at all is used, will form a resin inasmuch as the ketone alcohol is polyhydric.

Example I

| | Parts by weight |
|---|---|
| Dihydroxy acetone | 61.6 |
| Phthalic anhydride | 38.4 |
| | 100.0 |

These ingredients are heated under a short air-cooled reflux condenser at 150° C. for two hours, then at 190–200° C. for five to six hours. The product is a soft resin of dark amber color and of acid number 40–50, soluble in ketones, esters, and alcohol-hydrocarbon mixtures, and compatible with cellulose acetate.

In the preparation of resin whose ingredients comprise a ketone alcohol, the latter alcohol may be monohydric as well as polyhydric. In such cases a polyhydric alcohol, which may or may not be a ketone alcohol, is also used as an ingredient of the resin. The following example also illustrates the substitution of a part of the polybasic acid by a monobasic acid mixture (fatty oil acids); this materially increases the film durability.

Example II

| | Parts by weight |
|---|---|
| Acetol (acetyl carbinol) | 18.5 |
| Glycerol | 74.5 |
| Linseed oil acids | 279.5 |
| Phthalic anhydride | 127.5 |
| | 500.0 |

These ingredients are heated together slowly under an air-cooled reflux condenser in such a way that the temperature is raised gradually to 225° C. over a period of two hours. Heating is then continued at this point for 12 hours. This product is a tough, medium hard resin of acid number 20–25, easily soluble in esters and aromatic hydrocarbons and tolerates a large amount of aliphatic hydrocarbon diluent.

Tertiary ketone alcohols are not especially suited for the practice of the present invention inasmuch as the hydroxyl is more difficult to esterify and the alcohol tends to decompose before it is chemically combined.

I may also use certain types of ketone acids as a means for introducing ketone groups into the resins. While ketone acids in general may possibly be used, I find it most satisfactory for the purpose of the present invention to use polybasic ketone acids, especially those of the aliphatic type. The following is an example of a resin made from a polybasic aliphatic ketone acid and a polyhydric alcohol:

Example III

| | Parts by weight |
|---|---|
| Ketosuccinic acid | 68.2 |
| Glycerol | 31.8 |
| | 100.0 |

These ingredients are heated at 150° C. for 1½ hours, then at 180° C. for 3½ hours. The product is a hard, rather brittle resin of acid number 150–160, soluble in acetone and ethyl acetate. This resin is of somewhat inferior quality to that of Example I because of its brittleness and high acid number. These difficulties can be largely overcome in many cases, as in the following example where the ketone polybasic acid is used in conjunction with an ordinary polybasic acid. In this example fatty oil acids are used for the purposes of retarding gelation and increasing the film durability.

*Example IV*

| | Parts by weight |
|---|---|
| Ketosuccinic acid | 25.8 |
| Linseed oil acids | 92.1 |
| China-wood oil acids | 36.9 |
| Glycerol | 70.8 |
| Phthalic anhydride | 84.3 |
| | 309.9 |

These ingredients are heated to a temperature of 200° C. over a period of one hour, heating then being continued at this point for 3½ hours or until the resin reaches an acid number of 10–15. The product is hard, tough and forms rapid drying films. It is soluble in aromatic hydrocarbons, acetone, and butyl acetate, and compatible with cellulose derivatives.

Ketone polyhydric alcohols may likewise be reacted with ketone polybasic acids in accordance with the methods of the foregoing examples. In such cases, monovalent alcohols and acids may be substituted, preferably in chemically equivalent amounts, for a portion of the ketone-containing ingredients. Where no such substitution is made, it is frequently advisable to use an excess of the ketone polyhydric alcohol.

The methods of the present invention introduce —CO— groups into the resin in addition to the carbonyl groups normally present in the ester linkage. The ketone alcohols and ketone acids used in the practice of my invention are organic alcohols and acids containing at least one of groups

that is, a carbonyl group between two carbon atoms. Alcohols containing a carbonyl group between two nitrogen atoms, such as dimethylol urea, are not suited for the practice of this invention inasmuch as such alcohols tend to polymerize to an infusible mass before they can be esterified by the acidic resin ingredients.

In carrying out my invention, I heat the ingredients, in most cases in chemically equivalent proportions, at a temperature above their mixed melting point until resinification takes place. An atmosphere of an inert gas tends to produce lighter-colored products, and efficient agitation materially speeds up the process. The greater the percentage of monovalent ingredients (alcohols or acids), the softer will be the resin as a rule. Where a large amount of ketone alcohol or acid is used, cautious heating is advisable in the early stages of the resinification, since, if heated too rapidly, many of these compounds tend to decompose before being chemically combined. This is more frequently true in the absence of oil, gum and/or fatty acid modifiers. When such modifiers are not used, heating schedules of 1 to 3 hours at 150° C., then 2–5 hours at 180–200° C., have been found to be satisfactory. With oils, gums and/or fatty acids present, I have used temperatures as high as 250° C. or have continued the heating for as long as 12 hours. As a rule, continued heating decreases the drying time of films of the resin, increases the viscosity, produces a harder and darker colored product and very frequently results in an infusible, insoluble resin. In most cases it is desirable to discontinue the heating before this stage is reached, the approach of which is shown by the reaction mass becoming stringy, lumpy, and very viscous. As with most polyhydric alcohol-polybasic acid resins, the acid index is the best means of following the course of resinification, the end point being considered as that acid number corresponding to a resin of optimum physical characteristics for the particular purpose intended.

The process for making my improved resins can be carried out in open or closed vessels of glass, enamel, or of various metals, such as iron, aluminum or Monel, etc., with or without the presence of esterification catalysts, such as sulfuric acid, sulfonic acids, etc. Mechanical agitation is highly advisable and can be accomplished by stirring or blowing with the inert gas, preferably by the former. Reduced or increased pressures can at times be used advantageously. Auxiliary condensing systems, such as a short air-cooled reflux condenser, which permits the water of reaction to escape but retains for the most part any volatile resin ingredients, are often useful. I may also carry out the resinification in the presence of a solvent for the resin, which is nonreactive toward the resin and the ingredients thereof, and adjust the temperature of reaction (which is approximately the boiling point of the solvent) by applying various pressures to the system. In such cases vapors of the solvent and water of reaction can be conveniently passed through a downward condenser, the water then being separated from the solvent by chemical or mechanical means, and the latter returned continuously to the reaction vessel. Such non-reactive solvents are aromatic hydrocarbons or mixtures thereof, chlorobenzene, dichloroethyl ether, menthane, cyclohexanone, etc.

I have discovered, also, that the ketone group may be introduced into the resin by oxidation, as for instance with hydrogen peroxide, during or after resinification, of unchanged secondary hydroxyl groups which are present. I prefer, however, to have the ketone group present in one or more of the initial ingredients.

As other suitable ketone polyhydric alcohols there may be mentioned such ketone alcohols as γ,γ'-dihydroxy dipropyl ketone, diricinoleyl ketone and di-(hydroxy stearyl) ketone (obtainable by splitting out metallic carbonates from divalent metal salts of ricinoleic acid and of its hydrogenation product, hydroxystearic acid), p-methylol benzoyl carbinol, p,p'-dimethylol benzophenone, etc. Other ketone monohydric alcohols, such as propionyl carbinol, acetyl methyl carbinol, β-keto butanol, benzoyl carbinol, p-acetyl benzyl alcohol, o-benzoyl benzyl alcohol, benzoin, etc., may likewise be used instead of the acetyl carbinol mentioned in Example II. The ketosuccinic acid mentioned in Example III may be replaced with other aliphatic ketone polybasic acids such as acetone dicarboxylic acid, γ-ketosebacic acid, α,α'-diketo-adipic acid, oxalocrotonic acid, succino-succinic acid, etc. In general, I prefer the ketone alcohols to the ketone acids as resin ingredients and I prefer polyfunctional ketone acids; i. e., the polybasic ketone acids since their use allows the introduction of a considerable amount of ketone group without unduly sacrificing hardness, etc.

The polyhydric alcohols and polybasic acids, other than ketone alcohols and ketone acids, may be any of those known to be useful in the manufacture of polyhydric alcohol-polybasic acid resins. Suitable polybasic acids in addition to phthalic acid include such acids as succinic, adipic, sebacic, maleic, itaconic, hexahydrophthalic, tartaric, citric, dilactylic, thio-dilactylic, salicyl-acetic, chlorophthalic, diphenic, quinolinic naphthalic, pyromellitic, tricarballylic, etc., or mixtures thereof. Gylcerol may be replaced by well known polyhydric alcohols such as ethylene glycol and its higher homologs, e. g. propylene glycol; diethylene glycol and other polyglycols; polyglycerols; triethanolamine; pentaerythritol; and alkyl and aryl ethers of polyhydric alcohols which still contain at least two hydroxyl groups, such as monobenzylin and the diethyl ether of sorbitol.

As previously pointed out, the polybasic acid may be replaced by monobasic acids. For this purpose, I may use, in addition to the fatty oil acids of the examples, the acids derived from the saponification of such oils as soya bean, perilla, cottonseed, coconut, etc., also the pure fatty acids such as butyric, stearic, and oleic. Instead of or in addition to the fatty acids, I may use one or more natural resins or resin acids (for example, rosin, congo, kauri, pontianac, etc.), and/or aromatic monobasic acids, such as salicylic and benzoic acids. Also as auxiliary ingredients or modifiers of the resins I may employ fatty oils, such as soya bean, linseed, China-wood, castor, cottonseed, etc. In such cases, particularly where no monovalent ingredients are present, it is desirable first to heat the oil and polyhydric alcohol together, in the presence of an alcoholysis catalyst such as litharge, before adding the remaining ingredients (with the possible exception of castor oil which forms a clear resin by either method).

When it is desired to modify the resin by replacing a portion of the polyhydric alcohol with a monohydric alcohol, it is satisfactory to use alcohols such as amyl, benzyl, cyclohexyl, etc., or mixtures thereof.

It is to be understood that the reaction mixture comprises at least one ketone alcohol, or ketone acid of the type hereinbefore described, in addition to any of the above modifying agents which may be used. It is also to be understood that the ingredients comprise at least one polyhydric alcohol and one polybasic acid although, as previously pointed out, either or both of these may contain the grouping

The above oils, oil acids, resins, resin acids, monohydric alcohols and monobasic acids are examples of "modifying agents" which may be defined as organic compounds capable of entering into the polyhydric alcohol-polybasic acid esterification either directly or indirectly.

My improved resins are valuable ingredients of coating compositions, whether they are used alone or combined by mutual solvents or other means with one or more of the following: cellulose derivatives, such as cellulose acetate, nitrate, acetopropionate and other cellulose esters, and with ethyl cellulose, benzyl cellulose and other cellulose ethers; natural gums, such as rosin, kauri, and damar; combined natural gums, such as ester gum and ethyl abietate; drying oils, such as linseed and China-wood oils; various synthetic resins, such as phenol-formaldehyde, amine-aldehyde and vinyl resins; and bitumens, such asphalts. To my improved products, either alone or mixed with the above substances, I may add pigments, fillers, lakes, plasticizers, antioxidants, solvents, etc., as needed and desired. Any of the known methods of applying the protective finish, such as spraying, brushing, baking, air-drying, etc., may be used.

An especially valuable property of my new resins is their increased compatibility with cellulose esters of organic acids, such as cellulose acetate. Heretofore, in the preparation of coating compositions from polyhydric alcohol-polybasic acid resins and cellulose derivatives, the organic acid esters such as nitrocellulose have been used mostly because of the limited compatibility of the resin with the organic acid ester of cellulose. However, nitrocellulose is unsatisfactory because of its instability and generally hazardous nature. My new resins are synthesized from ingredients containing the same type of grouping which is present in the organic acid ester (the CO group), the result being that the resin and cellulose esters are more compatible.

My improved resins are also useful as binders and cements for general use; as impregnating agents for cloth, paper wood pulp, porous stone, etc.; as the sandwiching material or adhesive therefor in the manufacture of safety glass; binders for cellulose acetate, mica, etc., in the preparation respectively of laminated products and insulating materials; and for the preparation of linoleum plastics.

As many apparently widely different embodiments of this invention may be made without departing from the spirit and scope thereof, it is to be understood that I do not limit myself to the specific embodiments thereof except as defined in the following claims:

I claim:

1. The resinous reaction product of a mixture comprising resin-forming ingredients consisting of a polyhydric alcohol and polybasic acid, said mixture including a ketone alcohol selected from the class consisting of mono- and di-hydric ketone alcohols.

2. A polyhydric alcohol-polybasic acid resin comprising the reaction product of a ketone polyhydric alcohol and a ketone polybasic acid.

3. A polyhydric alcohol-polybasic acid resin comprising the reaction product of a polyhydric alcohol, a polycarboxylic acid, and a ketone monohydric alcohol.

4. The resin set forth in claim 3 in which the alcohol is glycerol and the polycarboxylic acid is phthalic anhydride.

5. The resinous reaction product of glycerol, phthalic anhydride and acetol.

6. The resinous reaction product of glycerol, phthalic anhydride and dihydroxy acetone.

7. The resinous reaction product of glycerol, phthalic anhydride and ketosuccinic acid.

COLE COOLIDGE.